US011543536B2

(12) United States Patent
Capet et al.

(10) Patent No.: US 11,543,536 B2
(45) Date of Patent: Jan. 3, 2023

(54) RELAY PLATFORM FOR TRANSMITTING POSITIONING SIGNALS TO ROVERS WITH AN OPTIMIZED RADIATION PATTERN

(71) Applicant: CENTRE NATIONAL D'ETUDES SPATIALES, Paris (FR)

(72) Inventors: Nicolas Capet, Toulouse (FR); François-Xavier Marmet, Muret (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 183 days.

(21) Appl. No.: 16/958,688

(22) PCT Filed: Dec. 14, 2018

(86) PCT No.: PCT/EP2018/085059
§ 371 (c)(1),
(2) Date: Jun. 27, 2020

(87) PCT Pub. No.: WO2019/129513
PCT Pub. Date: Jul. 4, 2019

(65) Prior Publication Data
US 2020/0343632 A1    Oct. 29, 2020

(30) Foreign Application Priority Data
Dec. 28, 2017    (EP) ..................... 17306960

(51) Int. Cl.
*H01Q 3/34*    (2006.01)
*G01S 19/11*   (2010.01)
(Continued)

(52) U.S. Cl.
CPC ............. *G01S 19/11* (2013.01); *G01S 1/0423* (2019.08); *H01Q 3/34* (2013.01); *H01Q 21/08* (2013.01); *H01Q 25/04* (2013.01)

(58) Field of Classification Search
CPC ........ G01S 1/0423; G01S 19/11; G01S 1/042; H01Q 21/08; H01Q 25/04; H01Q 3/08; H01Q 3/26; H01Q 3/34; H01Q 3/36
See application file for complete search history.

(56) References Cited

U.S. PATENT DOCUMENTS 3,922,685 A * 11/1975 Opas ................. H01Q 3/34
                                                    342/372
6,271,798 B1 * 8/2001 Endo ................. G01S 19/41
                                                    343/711
(Continued)

FOREIGN PATENT DOCUMENTS

EP    3 229 037 A    10/2017

OTHER PUBLICATIONS

Greving, et al., "A High Performance Elevation Phased Array Antenna for the MLS—System", Microwave, European Conference, 1991 21st European Microwave, pp. 647-652, Sep. 9, 1991.
(Continued)

*Primary Examiner* — Tho G Phan
(74) *Attorney, Agent, or Firm* — Burris Law, PLLC

(57) ABSTRACT

An antenna assembly configured to transmit terrestrial positioning signals from a relay platform having a frame of reference, the transmit being in at least a first mode with a radiating pattern having at least a main lobe having a narrow aperture in a plane and a wide aperture in a plane. A relay platform comprising a receiver of a synchronization signal, a transmitter of positioning signals to an area of service comprising a number of rovers, and an antenna assembly configured to produce a radiating pattern adapted to transmit the positioning signals as a function of the environment of the relay platform and the rovers. In a number of embodiments the relay platforms may be organized in a network of platforms, possibly of masters and slaves that receive feedback from the rovers in the AoS so as to optimize the
(Continued)

configuration of the antenna elements dynamically to optimize the QoS of positioning based on a number of selected quality indexes.

8 Claims, 11 Drawing Sheets

(51) Int. Cl.
*G01S 1/04* (2006.01)
*H01Q 21/08* (2006.01)
*H01Q 25/04* (2006.01)

(56) References Cited

U.S. PATENT DOCUMENTS

| | | |
|---|---|---|
| 9,007,254 B2 * | 4/2015 | Vangen .................. H01Q 17/00 |
| | | 342/159 |
| 9,118,103 B1 | 8/2015 | Banerjea |
| 9,680,234 B2 * | 6/2017 | Love ...................... H01Q 1/246 |
| 10,656,283 B2 | 5/2020 | Capet et al. |
| 2011/0151779 A1 | 6/2011 | Bongfeldt et al. |
| 2018/0180741 A1 | 6/2018 | Capet et al. |

OTHER PUBLICATIONS

Martin, Antenna Diagram Shaping for Pseudolite Transmitter Antennas—A Solution to the Near-Far Problem, Institute of Navigation, GPS, Sep. 14-17, 1999, pp. 1473-1482, Nashville, Tennessee.

* cited by examiner

RELAY PLATFORM FOR TRANSMITTING POSITIONING SIGNALS TO ROVERS WITH AN OPTIMIZED RADIATION PATTERN

CROSS-REFERENCE TO RELATED APPLICATIONS

This application is a National Stage of International patent application PCT/EP2018/085059, filed on Dec. 14, 2018, which claims priority to foreign European patent application No. EP 17306960.0, filed on Dec. 28, 2017, the disclosures of which are incorporated by reference in their entirety.

FIELD OF THE INVENTION

The invention relates to platforms for relaying positioning signals.

BACKGROUND

The use of navigation receivers becomes increasingly pervasive in everyday life. It is all the more common that cars' on-board electronics, smart phones, tablets and a significant portion of the IoT (Internet of Thinks) devices include navigation receivers, and that applications running thereon capture as input information on position and trajectory of the user of the terminal. Although their use in civilian applications is still constrained by safety and security concerns, drones become more popular and their navigation is very dependent on an accurate positioning.

Navigation receivers rely on L-Band RF signals transmitted by Medium Earth Orbiting satellites, which are generally included in constellations comprising tens of them to cover most of the surface of the earth, such as the GPS™ (US), Galileo™ (Europe), Glonass™ (Russia) and Beidou™ (China). These constellations are designated under the generic acronym of GNSS (Global Navigation Satellite System).

GNSS carrier signals are modulated by a pseudo-random code and a navigation message that allow calculation of a pseudo-range between the receiver and a specific satellite. With a minimum of four pseudo-ranges, it is indeed possible to calculate Position, Velocity and Time (PVT) of the receiver.

PVT measurements are affected by a number of approximations and/or errors, some of which are intrinsic to the principle of measurement used (i.e., due to the deviation in trajectory of the RF signals through the atmosphere—ionosphere and troposphere—due to variations in the orbits of the satellites), intrinsic to the receiver and satellite imperfections (clock biases for instance), or intrinsic to some configurations of the satellites in view at a moment in time (i.e. elevation of the satellites over the horizon; low dispersion of visible satellites—high Dilution of Precision or DOP). A number of corrections may be used to mitigate these errors, with the use of specific processing techniques which are only available to certain types of receivers. For instance, bi-frequency receivers can mitigate ionospheric errors with a gain of precision from a few tens of meters to a few meters, and even better when combined with precise satellite orbits and clocks which then providing Precise Point Positioning (PPP)—a precision of a few tens of centimetres. Differential GPS and Real Time Kinematics solutions provide similar precision from integration of outside information (relative positioning vis-à-vis a number of fixed reference stations with known positions).

It is however more difficult to mitigate in a consistent and efficient manner some errors which depend on the position of the receiver, notably when this position is surrounded by a number of objects which reflect the navigation RF signals and/or mask a number of the satellites which should be in line of sight (LOS) at a moment in time. In such conditions, the precision of the calculation of the PVT may be quite poor, all other causes of errors being equal, both at the time of acquiring a GNSS signal and at the time of tracking said signal.

Significant errors may be caused by multipath reflections. A first signal from a satellite is reflected by an obstacle on its LOS direction of propagation and may then interfere with a second signal that reaches the receiver in LOS, thus affecting the value of the pseudo-distance that is calculated from the LOS signal. In urban canyons (i.e. streets in between tall buildings), multipath will not only increase the error in the determination of the pseudo-range of a satellite (User Equivalent Range Error or UERE), but also the (Geometric) Dilution Of Precision, (GDOP or DOP), because the field of view of the antenna will be narrower thus limiting the increase in precision due to the use of additional satellites.

The degradation in UERE is due to the signal impairments of the specific satellite which is acquired or tracked by a tracking loop. Tracking of a satellite relies on a maximization of a correlation function between the acquired code signal and a number of local replicas generated by the receiver of the code signals which are specific to each satellite. The correlation functions will be corrupted by multipath and the satellite may not be correctly acquired or may be lost. Even if the signal tracking is still achievable, signal impairments will affect the correlation function's shape, thus degrading the pseudo-range estimation, and the UERE.

A number of mitigation techniques rely on an increase in the number of correlators to improve the performance of the receiver in a perturbed environment. A number of variants of signal processing techniques may also be added, depending on the waveform of the carrier signal. They may improve the quality of the pseudo-range measurements for the satellites in the field of view (FOV) of the receiver but will not improve the number of these satellites in view or the variance of their elevations. Thus, even with the use of complex and costly receivers, the DOP will be poor in any kind of environment where the FOV of the receivers is reduced.

There is a need for a solution to overcome the previously cited drawbacks, the solution being implemented in standard GNSS receivers. More specifically the relay platforms of the invention may be designed and/or configured to improve the quality of the positioning signals received by an end-user receiver.

SUMMARY OF THE INVENTION

To this effect, the invention discloses an antenna arrangement for distributing terrestrial positioning signals using radiating patterns conformed to increase the gain of transmission in Areas of Service (AoS) that are affected by multipath reflections and where receivers have a narrow FOV. The invention also provides a relay platform comprising a receiver of a synchronizing signal, a transmitter of terrestrial positioning signals and a transmitting antenna arrangement of a kind mentioned above.

More precisely, the invention discloses an antenna assembly configured to transmit terrestrial positioning signals from a relay platform having a frame of reference, said transmit being in a first mode with a radiating pattern having at least a main lobe having a narrow aperture in a first plane of reference comprising a vertical axis and a first horizontal axis and a wide aperture in a second plane of reference comprising the vertical axis and a second horizontal axis perpendicular to the first horizontal axis.

Advantageously, the radiating pattern is depointed in the first plane of reference.

Advantageously, the antenna assembly of the invention comprises N antenna elements of an identical form factor, N being higher than one, the N antenna elements being aligned in direction of the first horizontal axis and being spaced of an even distance d.

Advantageously, the N antenna elements are one of patch antenna elements laid out in a third plane of reference comprising the first horizontal axis and the second horizontal axis, or monopoles, dipoles or helical elements erected in the first plane of reference.

Advantageously, the antenna assembly of the invention further comprises a feeding circuit configured to feed all or part of the N antenna elements with positioning signals generated at an RF Front-End of a transmitter of positioning signals.

Advantageously, the feeding circuit comprises one or more combiners/dividers configured to combine positioning signals received from two or more channels of the transmitter of positioning signals into a single positioning signal.

Advantageously, the feeding circuit comprises one or more phase shifters configured to impart a predefined phase shift that varies linearly from a first antenna element to a next one in the line.

Advantageously, the feeding circuit comprises one or more switches configured to activate/deactivate one or more of the N antenna elements.

Advantageously, the feeding circuit comprises at least one Digital to Analog Converter and a beam-forming circuit.

Advantageously, the antenna assembly of the invention further comprises a control logic configured to generate control commands to be sent to the feeding circuit, to modify one or more of the aperture of the sectorial radiating pattern in the first plane of reference and a value of its depointing.

The invention further discloses a method of designing an antenna assembly fit to transmit positioning signals from a relay platform having a frame of reference, said transmit being in at least a first mode with a radiating pattern having at least a main lobe, the at least a main lobe having a narrow aperture in a first plane of reference comprising a vertical axis and a first horizontal axis and a wide aperture in a second plane of reference comprising the vertical axis and a second horizontal axis perpendicular to the first horizontal axis.

Advantageously, the method of the invention, comprises: defining one or more values of a desired aperture of the at least a main lobe of the radiating pattern in the first plane of reference; defining one or more desired values of depointing in the first plane of reference; defining one or more numbers N of antenna elements of a given form factor to be aligned in an x direction with an even spacing d; defining one or more values of a phase shift $\varphi$ to be applied linearly to all or part of the N antenna elements; wherein number N, spacing d and phase shift $\varphi$ are selected as a function of the one or more values of the desired aperture and the one or more desired values of depointing.

The invention further discloses a relay platform of positioning signals, the relay platform having a frame of reference and comprising: a receiver of a synchronization signal; a transmitter configured to condition one or more terrestrial positioning signals carrying a navigation message representative of a position and time using the synchronization signal; an antenna assembly configured to transmit the terrestrial positioning signals in at least a first mode with a radiating pattern having at least a main lobe having a narrow aperture in a first plane of reference comprising a vertical axis and a first horizontal axis and a wide aperture in a second plane of reference comprising the vertical axis and a second horizontal axis perpendicular to the first horizontal axis.

Advantageously, the receiver of a synchronization signal is a GNSS receiver.

Advantageously, the positioning signals are amplified transpositions of the GNSS signals that are amplified and modulated by a navigation message representative of the relay platform.

Advantageously, the positioning signals comprise a pseudorandom sequence and a navigation message generated at the relay platform and representative of the relay platform.

Advantageously, the relay platform of the invention further comprises one or more receive units using an RF uplink from one or more of another relay platform, a rover or a base station.

Advantageously, the transmitter further comprises a processing logic (810) configured to one of acquire or generate commands to be sent to the antenna assembly to switch from the first transmit mode to a second transmit mode.

Advantageously, the commands to be sent to the antenna assembly comprise one or more of an angle of aperture of the main lobe of the radiating pattern and an angle of depointing in the first plane of reference.

Advantageously, the commands are based on a quality index of the positioning signals received from rovers in an area of service of the relay platform.

The invention further discloses a method of positioning rovers comprising: acquiring a synchronization signal in a relay platform having a frame of reference; conditioning at a transmitter of positioning signals in the relay platform one or more terrestrial positioning signals carrying a navigation message representative of a position and time at the relay platform using the synchronization signal; feeding the terrestrial positioning signals to an antenna assembly; transmitting the terrestrial positioning signals to rovers; wherein the antenna assembly is configured to transmit the terrestrial positioning signals in at least a first mode with a radiating pattern having at least a main lobe having a narrow aperture in a first plane of reference comprising a vertical axis and a first horizontal axis and a wide aperture in a second plane of reference comprising the vertical axis and a second horizontal axis perpendicular to the first horizontal axis.

In one embodiment, the rovers and the relay platform are located in an Area of Service (AoS).

According to the invention, the terrestrial positioning signals may be replicas of GNSS signals (amplified and carrying an adequate navigation message). They may also be "GNSS-like" i.e. consisting in an RF carrier waveform that is modulated by a pseudorandom code, thus allowing calculating pseudo-ranges between the rover and the relay platforms that have known coordinates and a common time reference, possibly the time reference of one of the constellations of GNSS satellites that may be received at one or more of the relay platforms. In some embodiments, the position of the rover may be calculated using Time Difference of Arrival (TDoA) of the signals between the rover and a plurality (3 or more) relay platforms. The GNSS-like positioning signals also carry a navigation message that comprises the ephemeris of the constellation of relay platforms, including their true positions. This type of embodiment is advantageous because it is allows to use standard GNSS receivers to decode the GNSS-like positioning signals. Also, it is possible to blend in a standard PVT calculation a combination of pseudo-ranges to satellites in the FOV based on true GNSS signals and pseudo-ranges to relay platforms based on GNSS-like signals, when these terrestrial positioning signals have the same time reference and coordinate system as the GNSS signals.

In some other embodiments, the terrestrial positioning signals may be carrier waves that are not modulated by a pseudo-random code. In this type of embodiments, the position of the rover is calculated using one or more of Direction of Arrival (DoA), Time of Arrival (ToA), Received Signal Strength Index (RSSI) or Signal to Noise Ratio (SNR) computations, the positions of the relay platforms being known to the rovers, either from a navigation message transmitted to the rover by the terrestrial positioning signals or through another communication link. The positions of the relay platforms may also be known a priori by the rovers, for instance if they are included in the map of the navigation system that is used by the rovers, said information being optionally refreshed from time to time.

The GNSS-like or other positioning signals may be generated directly by an RF waveform generator and a modulator to include a pseudorandom code and/or a navigation message. In this case, it is necessary to synchronize the transmitters in the relay platforms with a common time reference. A GNSS signal may be the source of this single time reference. Also, GNSS signals may be the source of the non-GNSS positioning signals, an RFFE being interposed between the receiver of GNSS signals and the transmitter of non-GNSS positioning signals to amplify the signal and modulate the baseband signal with another navigation message that comprises the ephemeris (coordinates, ID, etc. . . . ) of the relay platform.

The invention may be implemented in a number of different communication architectures.

In some embodiments, the invention may be implemented using only downlinks to transmit the positioning signals from the relay platforms to the rovers. The downlinks will use an RF communication media.

In some other embodiments, the invention may be implemented also with an uplink from the rovers to the relay vehicles. The uplink may use an RF or an optical communication media. The uplink may be used, by way of example, to transmit to the relay platforms one or more indexes of the quality of the reception of the positioning signals at the rovers. These indexes of quality may be used to adjust the shape of the positioning signals radiated from the relay platforms to improve the Quality of Service (QoS) in a definite AoS.

The invention may be implemented in a number of different processing architectures. The relay platforms may be totally independent from one another (i.e. not interconnected). In a number of embodiments, the relay platforms may be synchronized to a common time reference that may be the time reference of one of the GNSS constellations received at the GNSS receiver of the relay platform. In a number of embodiments, one of the relay platforms in an AoS may be a master relay platform that receives data from the rovers through a communication uplink, calculates a joint optimization of the configuration of the relay platforms in the AoS and sends commands to the slave relay platforms.

The antenna arrangements of the invention that transmit the positioning signals from the relay platforms to the rovers may be of different kinds selected to be well adapted to the geometric and environmental parameters of the AoS. The antenna arrangements may be fixed or adaptable to the conditions of reception of the terrestrial positioning signals at the rovers.

Thanks to its versatility, the invention may be adapted to a number of use cases.

It may for instance be used to provide positioning services in difficult urban areas, such as urban canyons, especially when high integrity and/or high accuracy and/or high availability is mandatory, for example for guiding autonomous cars or drones.

The invention may also be deployed on an ad-hoc basis and used to provide rescue workers in an area that has been destroyed by an earthquake with accurate positioning, even in a difficult environment (including from an RF interference point of view).

According to the invention, a design method is provided to assist in the deployment of an infrastructure of relay platforms that are adapted to the configuration of one or more AoS.

BRIEF DESCRIPTION OF THE DRAWINGS

The invention and its advantages will be better understood upon reading the following detailed description of particular embodiments, given purely by way of non-limiting examples, this description being made with reference to the accompanying drawings in which.

DETAILED DESCRIPTION

Figure 1:
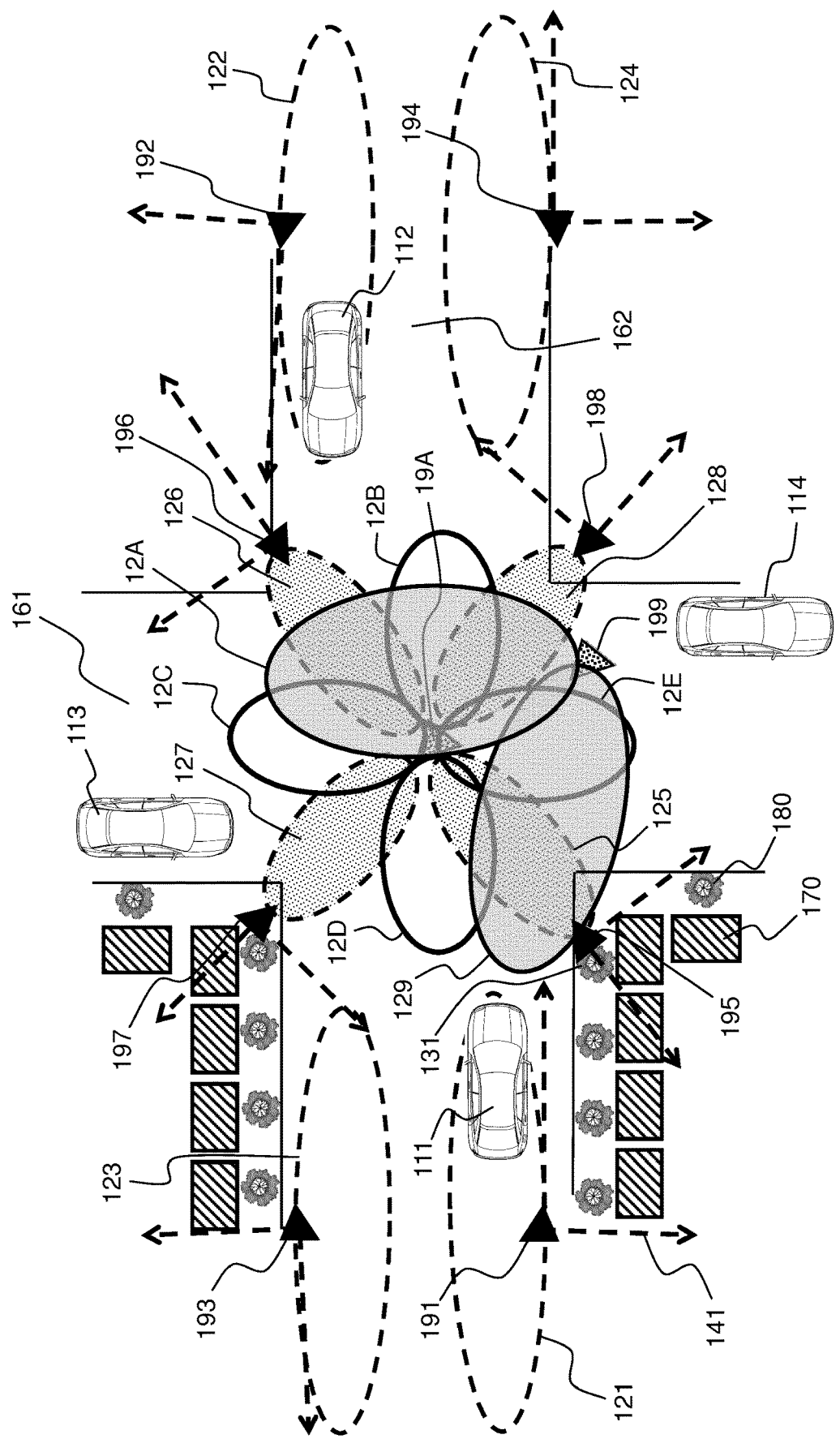
FIG. 1 displays a top schematic view of a configuration of relay platforms with radiation patterns of a specific shape to implement the invention in a number of its embodiments.
Figure 1A:
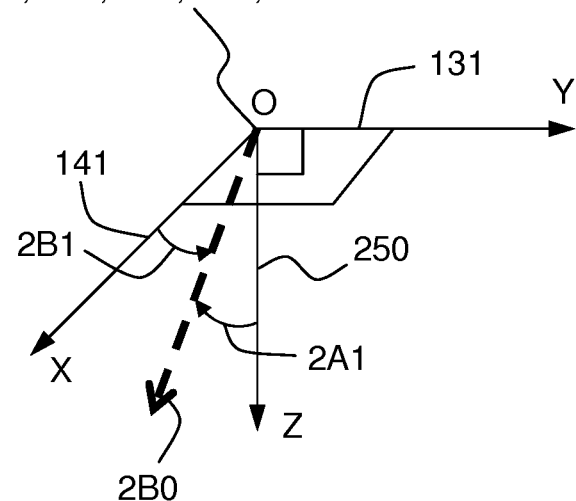
FIG. 1a represents a coordinate system of a local frame of reference of a relay platform.

FIG. 1a represents a coordinate system of a local frame of reference of a relay platform.

To reference the position and orientation of a relay platform, a coordinate system of a frame of reference (X, Y, Z) that is represented on the FIG. 1a is used in the drawings and description.

The origin of the coordinate system is referenced O, and on other figures, 191, 192, 193, 194, etc. The origin is located at a point of the relay platform that may be, for example a central position of the receiving antenna assembly (see FIG. 4). Axis Y, 131, is preferably positioned in a direction of the horizontal plane X, Y that may be a direction of a main lobe of the radiating pattern of the emitting antenna assembly. Axis X, 141, that defines a first horizontal axis, is preferably a direction perpendicular to axis Y (defined as second horizontal axis) that is pointing toward a direction towards which the radiated power of the emitting antenna assembly being minimal (i.e. towards obstacles in the trajectory of the emitted signals). Axis Z, 250, is preferably a direction perpendicular to the X, Y plane that is pointing to the ground and thus defines a vertical axis. The references 131, 141, 191, 192, 193, 194, etc. are the same as the ones used in FIG. 1. Reference 250 is used in FIG. 2. The (X, Z) plane defines a first plane of reference, while the (Y, Z) plane defines a second plane of reference and the horizontal (X, Y) plane defines a third plane of reference.

The angles of an RF ray, 2B0, in the coordinate system are measured as the azimuth angle $\psi$, 2B1, to axis X and the elevation angle $\vartheta$, 2A1, to axis Z. The ray 2B0 and the angles 2A1 and 2B1 are also referenced on FIG. 2.

The local frame of reference may itself have absolute coordinates defined for instance in the ECEF (Earth Centered; Earth Fixed) frame of reference or in another frame of reference.

FIG. 1 displays a top schematic view of a configuration of relay platforms with radiation patterns of a specific shape to implement the invention in a number of its embodiments.

As explained below, multipath reflections are notably penalizing in urban canyons. Generally speaking, urban canyons often refer to streets or roads of a width of a few meters to a few tens of meters to the side of which are located buildings with their front face aligned on the main direction of the street/road. The height of the buildings may vary from a few meters to a couple of hundred of meters. The front face of the buildings will be more or less continuous, depending on the number of crossing streets/roads and the density of the area.

Outside urban areas, the "canyoning effect" of buildings may come from trees, advertising panels, signaling symbols, or other elements that may reflect or affect GNSS signal propagation.

In addition, in this type of areas, the FOV above the positioning signals receiver is quite narrow, meaning that the DOP will be poor. The combination of strong multipath and poor DOP yields very low accuracy and integrity of the positioning measurements. According to the invention, it is therefore advantageous to use relay platforms that transmit terrestrial positioning signals, generated directly or from received GNSS signals with a radiated energy that is significantly higher than the energy of satellite navigation signal and that is focused in the useful zones of the AoS, i.e. the zones where rovers navigate. This may be achieved thanks to antenna arrangements and circuits that are configured for shaping a radiating pattern adapted to the topology of the canyon. Other types of antenna arrangements, with adequate circuits, may be envisaged by a person of ordinary skills, such as meta-surface antennas, antennas with a forbidden band (Electromagnetic Band Gap or EBG antennas), reflect arrays or the likes.

FIG. 1 represents shapes of radiating patterns which are specifically interesting in an urban canyon. The figure illustrates a plurality of vehicles (or rovers, the two terminologies being equivalent in this description) 111, 112 travelling on the right side of a street 161 and 113, 114 travelling on the right side of a street 162 that is perpendicular to the street 161. Each rover carries a GNSS receiver. A plurality of relay platforms 191, 192, 193, 194 according to the invention are located at places selected so that the radiations from transmitters of positioning signals in the relay platforms may be configured to reach the right side of the street 161. The relay platforms may be positioned at the top of buildings, or mid-height, or another height, depending on the local conditions. The antenna assemblies of the transmitters are configured in a manner whereby the radiating lobes 121, 122, 123, 124 of the antenna assemblies of the transmitters are shaped to have a larger gain in the direction of movement 131 (direction y or −y in the local frame of reference of the relay platform of FIG. 1a) of the relay platforms 191, 192, 193, 194. With such a shape, the LOS signals, which come from above the receiver, will reach the receivers in the rovers with a larger gain than the Non-LOS signals reflected by the front faces of the buildings 170 situated alongside the streets/roads. Reflections on obstacles located along the buildings, such as trees or light poles 180, will also be attenuated, when they reach the receivers. Other relay platforms (not shown on the figure) may be positioned similarly on street/road 162.

In a variant of the invention, the lobes (121 to 125) are twisted towards the middle of the street/road (direction x, 141, being twisted upwards), so as to better attenuate the reflections on the front faces of the streets/roads or obstacles situated along the streets/roads.

In another class of embodiments, at the crossing of streets/roads 161, 162, additional relay platforms 195, 196, 197, 198 may advantageously be positioned, at the top of buildings, or at mid-height, or another height, in a manner where the radiating lobes 125, 126, 127, 128 of the antenna assemblies of the transmitters of positioning signals in the relay platforms are directed towards the center of the crossing of the streets/roads 161, 162. Thus, the conditions of reception of the positioning signals at the crossing will be improved. Other configurations of crossings may be considered and the positions of the relay platforms and orientations of the antenna assemblies of the transmitters of positioning signals may be configured accordingly as explained below in relation to FIG. 11.

Optionally, additional relay platforms may be positioned on traffic lights or billboards, close to a cross-road, at a distance from the buildings, like relay platform 199, that may produce a radiating pattern with two main lobes, 129 and 12A, that are configured to radiate close to the directions of the streets 161, 162. Also, a relay platform may be positioned at the center of a cross-road, on an elevated traffic light, or close to the ground in the middle of a roundabout, like relay platform 19A. The emitting antenna assembly of this relay platform may be configured to generate a plurality of main radiating lobes 12B, 12C, 12D, 12E, that radiate their power in the four directions along the streets 161, 162.

The configurations of the antenna assemblies of the invention to shape the radiating patterns displayed on the figure are explained in detail further down in the description, notably in relation with FIGS. 7a to 7h, 8a to 8c and 9.

Figure 2:
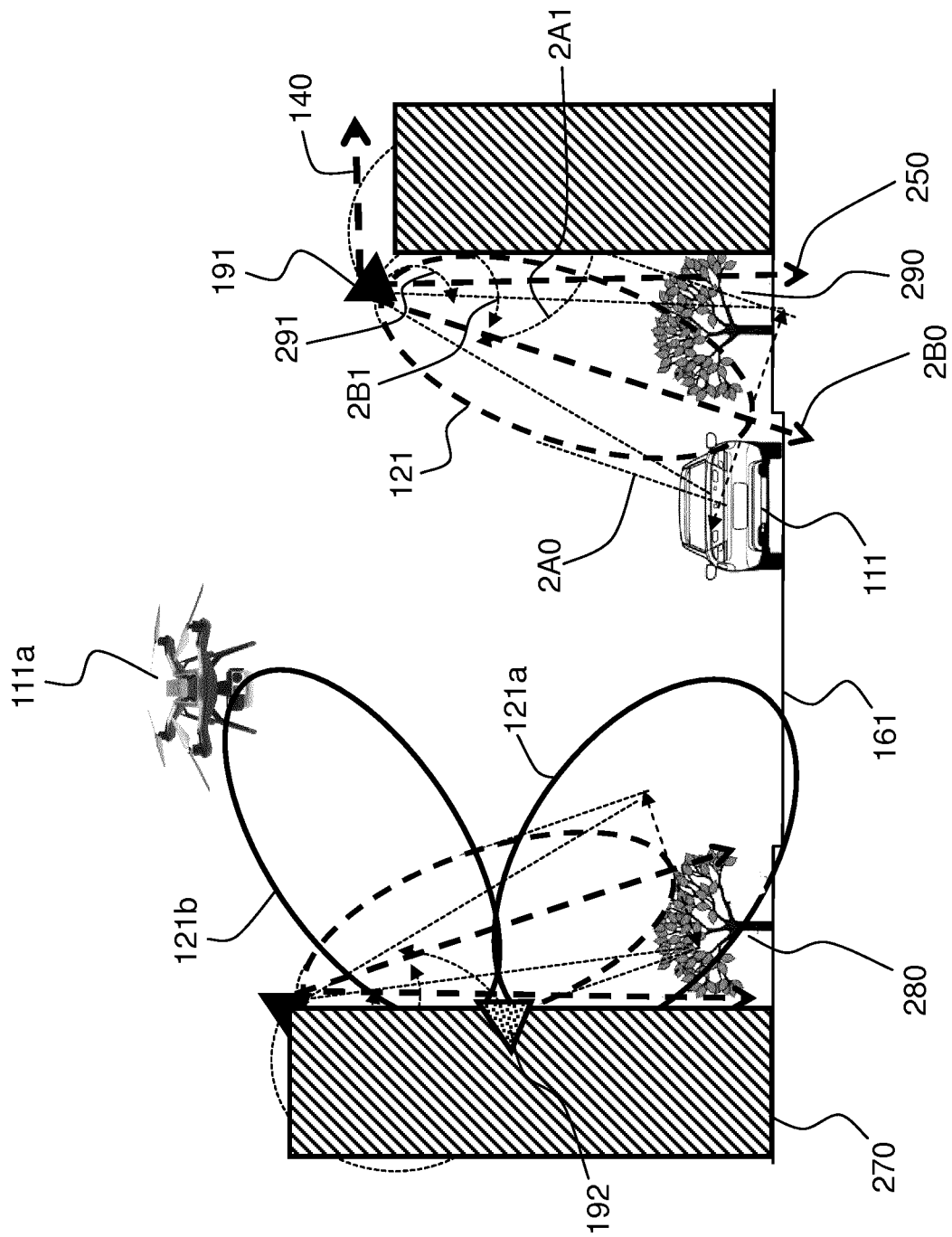
FIG. 2 displays a cross-section schematic view of a configuration of relay platforms with radiation patterns of a specific shape to implement the invention in a number of its embodiments.

FIG. 2 displays a cross-section schematic view of a configuration of relay platforms with radiation patterns of a specific shape to implement the invention in a number of its embodiments.

FIG. 2 displays a cross-section of FIG. 1 along axis 140 that is the x axis in the frame of reference of the relay platform. It displays a back face view of the vehicle 111 of FIG. 1 where it is apparent that the lobe 121 of the emitting antenna assembly of relay platform 191 has a maximum gain that is directed towards the street. The assumption on the figure is that the vehicle travels on the right side of the street. A symmetrical twist is possible, without departing from the scope of the invention, in case the vehicle travels on the other side of the street. The twist of the radiating lobe may be imparted either by a positioning of the antenna assembly in the relay platform or by a shaping of the radiating pattern as will be explained further below.

It is indeed advantageous to shape the left limit 290 of the radiation pattern (angle 291 with the x axis 140 of the frame of reference of the relay platform) so as to confine said radiation pattern in the canyon, minimizing reflections on the front face of the buildings. A value close to 90° may be adequate for this purpose, the left limit 290 of the vertical cross-section of the radiating pattern of the antenna being then almost collinear with axis 250 that is the z axis of the frame of reference of the relay platform. It may also be advantageous to shape the right limit 2A0 of the radiation pattern, so as to possibly minimize/reduce the reflections of multipath signals on the front faces of the buildings 270 located on the other side of the street/road. Of course, right and left may have to be inverted in countries where automotive vehicles drive on the left hand-side of a street/road. Right limit and left limit may be calculated in a number of ways, for instance by propagating the aperture of the main lobe of the radiating pattern to the area where the antenna gain becomes minimal and then connecting these points to the centre of the frame of reference. Other ways, not illustrated on the figure are also possible. Advantageously, the axis 2B0 of the main lobe may be depointed in the (x, z) plane by an angle 2A1. Depointing an antenna means changing the pointing of the antenna of a defined angle in a defined direction. In most cases, it is advantageous to point to the street to improve the conditions of reception in the rovers travelling along this direction.

In some embodiments of the invention, a relay platform 192, 193, 194 may be positioned mid-height of the building 270 and the antenna assembly of the emitter of the relay platform may be configured to have two main radiating lobes, a first one 122a pointing to the ground and a second one 122b pointing to the sky. The first lobe will send the peak power of the terrestrial positioning signals to cars, pedestrians, cyclists or motorcyclists travelling on the street 161, whereas the second lobe will send the peak power of the terrestrial positioning signals to aerial vehicles, such as the drone 111a.

In some embodiments, angles 291 and 2A1 may be configurable and may be used to control the downward looking field of view (FOV) of the antenna assembly of the transmitter of positioning signals.

The relay platforms may transmit positioning signals to GNSS receivers that may be carried by cyclists, motorcyclists or pedestrians (not shown on the figure).

The relay platforms of the invention may receive GNSS signals in the L-Band (i.e. around 1.5 GHz or around 1.2 GHz for the L5/E5 bands of the GPS and Galileo constellations for the current services available to the general public). Other bands, like the S-band, may be used by some constellations now or in the future. The relay platforms of the invention may easily be adapted to such changes.

The relay platforms of the invention may transmit positioning signals that are configured in a GNSS-like mode or that use other modes of positioning at the rovers, as explained further below in the description. The antenna assembly of the invention may be configured to switch from a first mode where the radiating lobes are shaped in one of the variants illustrated on FIGS. 3c to 3d, to one or more other modes, such as modes with a plurality of main radiating lobes.

FIGS. 3a, 3b, 3c and 3d represent some examples of typical radiating patterns, some of which may be used according to some embodiments of the invention.

Figure 3B:
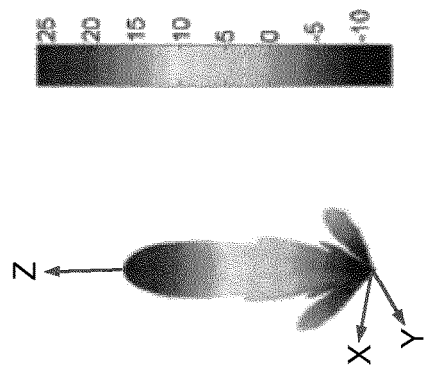
FIGS. 3a, 3b, 3c and 3d represent some examples of typical radiating patterns some of which may be used according to some embodiments of the invention.
Figure 3D:
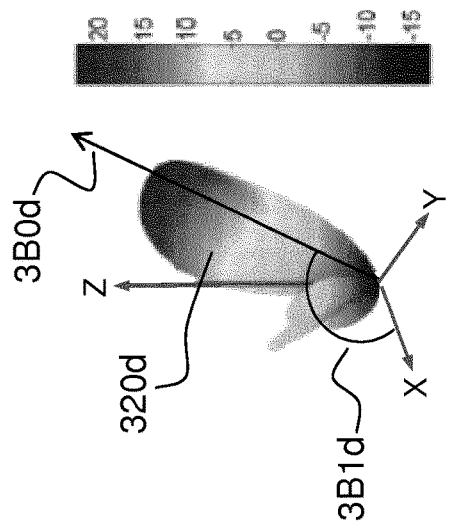
Figure 3A:
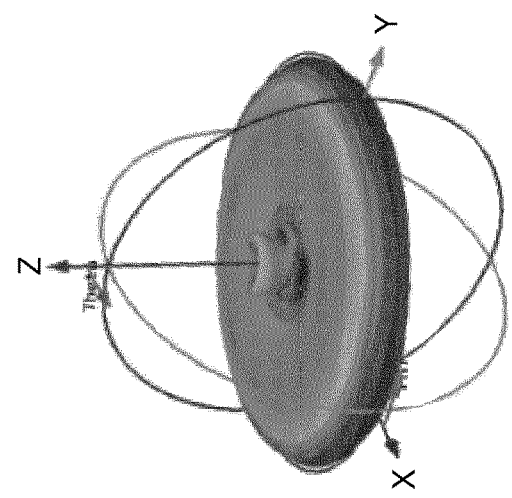

FIG. 3a illustrates a typical radiating pattern of an omni-directional antenna, such as a monopole or dipole antenna that may be commonly used to transmit RF signals. Such an antenna will then transmit signals in all directions of space, even when obstacles are present between the antenna assembly and the receivers, thus losing some energy and creating multipath reflections.

FIG. 3b illustrates a typical radiating pattern of a directive antenna. With such an antenna, it may be difficult to transmit RF signals to more than one rover at the same time. Also, this type of directive antenna is ill-suited to transmit signals to moving rovers, unless the antenna is configured to track the rover. While this makes a solution of this type more costly, it may still be advantageous to provide good rejection properties of interfering or jamming signals, which makes such configuration quite interesting for instance for military, government or professional applications.

Figure 3C:
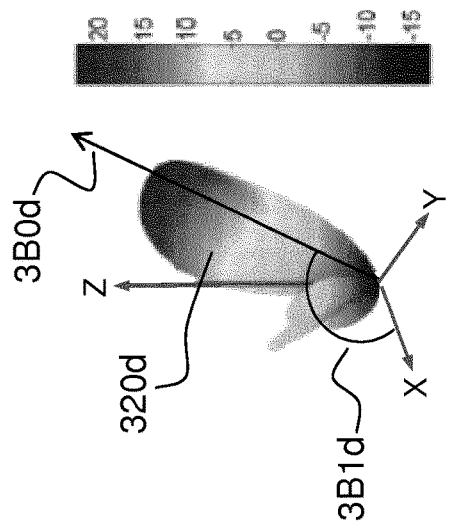

FIG. 3c illustrates a typical radiating pattern of a sectorial antenna. There, the main radiating lobe 320c is similar to the one represented as 120 on FIG. 2, except that it is not depointed. The main lobe has been conformed with a maximum gain in the (y, z) vertical plane. It has only a small extension on both sides (390c, 39Ac) of a plane of symmetry that is located in the vertical plane. The gain of the antenna is quite low outside of these extensions. This property makes this type of antennas suitable to a certain extent to implement the invention.

FIG. 3d illustrates a typical radiating pattern of a depointed antenna. There, the main radiating lobe 320d has an axis of symmetry 3B0d that has an angle 3B1d to axis x that is higher than 90°, as illustrated on FIG. 2. This property also makes this type of antennas suitable to a certain extent to implement the invention, for instance to avoid creating signal reflections on the walls of the buildings or other obstacles, thus minimizing multipaths and maximizing signal strength in the center line of the street.

According to the invention, it is therefore advantageous to use an antenna arrangement of a sectorial type, the main lobe of which may have an adjustable aperture (390c, 39Ac) in the (x, z) plane, whose axis of symmetry may be depointed to an axis 3B0d. The radiating pattern is then a combination of the ones of FIGS. 3c and 3d. The design and control of such antenna arrangements are commented upon further down in the description.

In some embodiments of the invention, it may also be advantageous that the antenna assembly of the emitter of the relay platform have two or more main radiating lobes.

Figure 4:
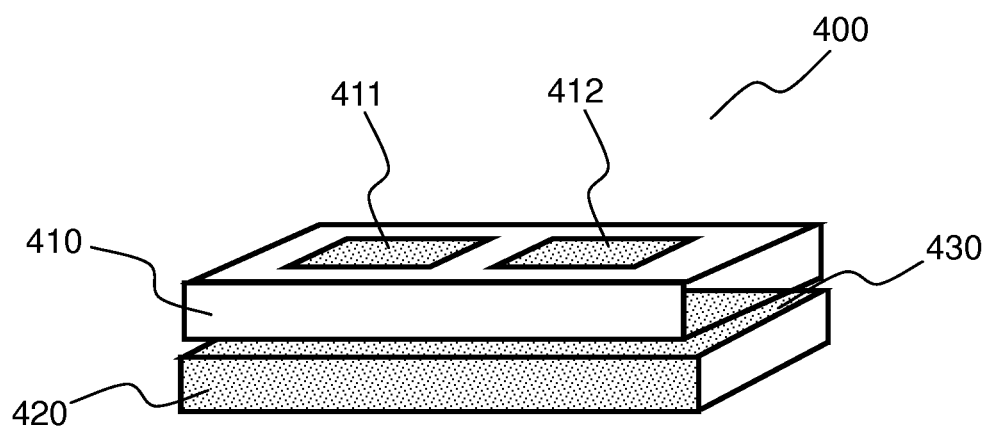
FIG. 4 displays a schematic view of a receive/transmit module of a relay platform to implement the invention in a number of its embodiments.

FIG. 4 displays a schematic view of a receive/transmit module of a relay platform to implement the invention in a number of its embodiments.

In some embodiments, the relay platform may comprise only a transmit module 420. A time reference common to all relay platforms (at least in an AoS) needs to be provided. This may be achieved through a Network Time Protocol (NTP) reference received from a network management server connecting the relay platforms. Then, the transmit module will comprise a carrier wave generator to generate a positioning signal at a specific frequency (GNSS or Wi-Fi; see below) and a modulator to embed on the carrier waveform one or more of a pseudorandom sequence or a navigation message comprising the relay platform ephemeris (ECEF coordinates, time reference, etc. . . . ).

FIG. 4 represents another type of embodiment with a complete Transmit/Receive (T/R) module 400. The T/R module is located in a relay platform according to the invention. The T/R module may comprise a source of electric power such as a battery, a solar panel or a connection to a power line (DC or AC with an adequate converter), not shown on the figure. The elements of the T/R module may be housed in a single box (as shown on the figure) or in different boxes. The T/R module may be positioned in a fixed orientation selected as a function of the receiving conditions of the GNSS signals and/or the transmitting conditions of the positioning signals to the rovers in the AoS. To this effect, the T/R module may be situated on a mast (not shown on the figure) that may be oriented in a fixed orientation or that may be steerable in a manner known to a person skilled in the art of installation of RF T/R modules. The steering may be actuated at the time of commissioning or, to a certain extent, dynamically during operation.

The Receive module 410 is configured to receive GNSS signals from a number of constellations. The GNSS receiver may be a standard receiver, provided however that the raw signals received may be captured, for instance at its RF Front-End (RFFE). It may comprise an upward looking antenna assembly 411, 412. The antenna assembly may be a combination of patch antennas comprising, for instance two elements, as represented on the figure, while the invention is in no way limited to such a configuration. In some embodiments, the antenna assembly may be selected to be able to shape the radiating pattern so as to improve the relative SNR of the satellites in LOS. Antenna assemblies of this type are disclosed by European patent applications n° 16305611.2 and 16306791.1 assigned to the same applicant as the instant application. The antenna assembly may also be a Controlled Radiated Pattern Antenna (CRPA) to provide an anti-jamming and/or anti-spoofing capability, especially for mission critical systems. Preferably the receiver 410 will have a multi-constellation capability to increase the number of positioning signals to select from.

In a number of embodiments, a GNSS time reference is used to synchronize the relay platforms, in lieu of the NTP reference mentioned above.

The T/R module 400 also comprises a transmitter of positioning signals 420 that will be described below in further details in relation to FIG. 5.

Since the transmitter 420 is, in some embodiments, configured to transmit at the highest possible power, it will have to be isolated from the GNSS receiver antenna(s) to avoid perturbing its conditions of reception. For instance, the receiver may comprise an isolating housing, or at least a backplane 430.

Optionally, the T/R module 400 may comprise a receiver of uplink signals from the rovers, for instance of WiFi or optical signals (not shown on the figure). This receiver may be combined in the same module 420 as the transmitter. Alternatively, or in addition, the T/R module 400 may also comprise a receiver of signals from other relay platforms or a base station (not shown on the figure) that may use the same band as the uplink from the rovers, or another band. This receiver of signals from other relay platforms or base station may be combined with the uplink receiver or may be distinct. In some embodiments, the T/R module 400 may also comprise a transmitter to transmit information to other relay platforms or a base station (not shown on the figure). The transmitter may be collocated or not with the receiver of signals from other relay platforms or base station and/or the transmitter 420 of positioning signals.

The T/R module 400 may comprise a processor (not shown on the figure) that is used to calculate commands used to optimize the geometrical configuration of the antenna arrangement, as discussed below in relation to the description in relation to FIG. 5.

Figure 5:
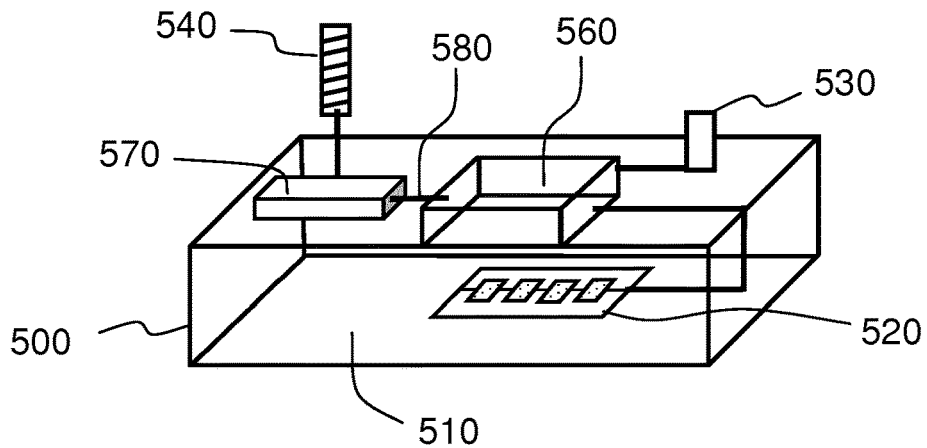
FIG. 5 displays a schematic view of a transmit module of a relay platform to implement the invention in a number of its embodiments.

FIG. 5 displays a schematic view of a transmit module of a relay platform to implement the invention in a number of its embodiments.

The transmit module 500, including the antenna arrangement, is represented in a single box, but a specific packaging is in no way mandatory to implement the invention. Notably, the description of FIGS. 7a through 7h and 8a through 8c will allow a person of ordinary skill to design and implement the invention according to the teachings disclosed in this specification. In particular, when it is contemplated that a relay platform operates only in a same urban environment, it may not be necessary to add features with the capability to switch from an environment affected by multipath reflections to full LOS environment. Accordingly, the antenna elements may in such use cases be housed in a standard package and be connected to the transmitter of positioning signals by a standard connection, without any need for a specific feed circuit, as illustrated further below on FIG. 7a, the specific shape of the antenna arrangement radiating pattern being obtained thanks to the physical constitution and relative positioning of the antenna elements. A number of variants (e.g. number of elements, form factor of the antenna elements, etc.) known to the skilled artisan may be made to the antenna arrangement depicted on FIG. 7a to implement the invention.

In other use cases, it may be advantageous to be able to design and manufacture an antenna assembly that is configurable, so as to be able to produce a sufficient number of products based on this design and reduce manufacturing setup and purchasing costs. In this class of embodiments, the antenna assembly may be versatile enough to be able to switch from a first operating mode, adapted to an environment affected by multipath reflections to a second mode that is adapted to an environment where reception of all satellites in view is LOS only, or where Non-LOS signals are very limited.

In still other use cases, more than two modes may be provisioned. For instance, three operating modes of the antenna assembly may be provisioned, a first mode adapted for areas with a very limited field of view (FOV) of LOS reception, a second mode adapted for areas with a broader FOV of LOS reception and a third mode adapted for areas with a full FOV of LOS reception. The different modes may be determined by the angles of the left and right limits of the main radiating lobe of the antenna arrangement, as illustrated by references 2A0 and 290 of FIG. 2. For instance in a first mode, angle 291 may be set at 105° and elevation angle 2A1 at 135°. Such values define a narrow aperture or FOV of the antenna arrangement in the (x, z) plane, defined in the frame of reference of the relay platform. In a second mode, angle 291 may be set at 90° and elevation angle 2A1 may be set at a value between 120° and 150°. In this second mode, the aperture or FOV of the antenna arrangement in the (x, z) plane is wider than in the first mode. Such an embodiment will be suitable for a configuration where there is a wide FOV in which signal reception is in LOS. In a third mode, angle 2A1 may be set at a value between 150° and 180° and angle 291 may be set at a value lower than 90°, possibly at a value of 30°, or between 0° and 150°. In this third mode, the aperture or FOV of the antenna arrangement in the (x, z) plane is wider than in the first and second modes. The aperture or FOV of the antenna arrangement may be, in another embodiment, the same in the three modes in the (y, z) plane defined in the frame of reference (x, y, z) of the relay platform. A narrow aperture will generally have an angle smaller than 90°, preferably smaller than 60°, still preferably smaller than 45°. A wide aperture will generally have an angle larger than 90°, preferably larger than 120°, still preferably larger than 135°. A method to determine the optimal aperture angle (between right and left limits—290 and 2A0—) is to set the aperture so that the left and right limits of the aperture determine a beam whose power is concentrated in the aperture with a gain outside the aperture that is lower than the maximum gain minus 3 dB.

The third mode may also be a pure omnidirectional radiating mode, without any specific shaping of the radiating pattern of the antenna arrangement. This may be obtained either by switching to an alternative antenna assembly or by switching off most of the antenna elements of the antenna assembly of the invention, i.e. leaving only activated one or two elements located in the middle of the array. It is to be noted that the determination of angles 291 and 2A1 results from a combination of the physical characteristics of the antenna arrangement (number or elements N, distance between them, d) and the dephasing φ applied (that will impact both the aperture of the main lobe and the value of its depointing) as described below in relation to FIGS. 8a to 8c and 9.

The number of modes and the angles determining their limits may vary as a function of the use cases. A common generic design of an antenna arrangement fit for implementing the teachings of the invention may be selected (for instance one of the designs depicted on FIGS. 7a through 7h). The parameters determining the operating modes may be configured at the time of detailed design or manufacturing, based on the operating conditions of the transmitter of the relay platform to be used with the antenna arrangement. Statistical data may for instance be used to define an optimum number of modes and the limits of the FOV angles of each mode for specific conditions of transmission at the place where the relay platform will be located.

Switching between modes may be user-triggered or automatic. When it is user-triggered, a simple button, voice or touch command may be provisioned to operate the switch. In automatic mode, some processing logic may be provisioned to control the command of the switch. For automatic switching, the trigger may come from a QoS index sent by a GNSS receiver of a rover in the AoS of the relay platform. This may for instance be the case when there is a change of meteorological conditions, a change in the topography of the buildings, road works or traffic density, fluidity or composition.

Depending on the configuration of the antenna arrangement, the command control of the switch may be mechanical or electrical, or a combination of both. Electrical control may for instance consist in modifying the circuit of the feed lines of the antenna arrangement by commanding one or more switches to activate/deactivate some antenna elements, to modify the FOV of the radiating pattern. It may also consist in configuring differently a phase shifter arrangement driving the antenna arrangement, as will be commented below in relation to other figures further down in the description.

The antenna arrangement of FIG. 5 may be used notably when at least two operating modes are envisaged, the notion of operating mode having the meaning explained above. FIG. 5 is a stylized view of an assembly that may have several form factors and may be located at different places, in relation to the transmitter of positioning signals. It may comprise a downward looking radome 510 to protect the antenna elements 520 from rain or snow.

The transmit module also advantageously includes a DC input 530, an input 540 from the GNSS receiver to the RF Front-End (RFFE) 570 of the transmitter and a connection 580 from the RFFE to an Antenna Control Unit (ACU) 560 (as represented on the FIG. 5; see below) or directly to the antenna elements 520, when there is no ACU.

In some embodiments, the RFFE of the transmit module is configured to acquire and decode the GNSS signals received at the receiver, amplify them, insert a navigation message comprising the ephemeris of the relay platform (identification, position), amplify the signal and retransmit it. In some of these embodiments, it may be advantageous, to comply with possible spectrum regulations, to retransmit the signal in one of the ISM bands (2.4 or 5.2 GHz for instance). The signal will then have to be down converted at the receivers to be processed by a standard GNSS receiver with a specific hardware or software add-on.

In some other embodiments, the RFFE of the transmit module is configured to condition GNSS-like signals, in the L-Band (i.e. around 1.5 GHz or 1.2 GHz for the current services available to the general public or any band where GNSS signals may be transmitted, now or in the future, such as the S-band). In this class of embodiments, the RFFE generates its own carrier, modulates it with a specific pseudorandom sequence (PRS), inserts a navigation message, like in the first class of embodiments and transmits the signal. One of the advantages of using this type of GNSS-like signals is that they may be decoded by any GNSS receiver without any modification, said receiver being able to use these signals in combination with true GNSS signals to compute a PVT from all the pseudo-ranges calculated from the GNSS satellites (or those with a quality index higher than a threshold) and the pseudo-ranges calculated from the relay platforms. In some jurisdictions though, using a GNSS band may not be authorized at a power level that would be useful. In this case, the signal may be generated in one of the ISM bands (2.4 or 5.2 GHz for instance). But the receivers may also imply the use of a specific hardware or software add-on to down convert, demodulate and process the specific PRS to calculate pseudo-ranges or TDoA measurements.

In yet some other embodiments, the RFFE may be conditioned to generate positioning signals in one of the ISM bands (2.4 or 5.2 GHz for instance). The positioning signals will comprise a navigation message but no pseudorandom sequence. In this class of embodiments, the positioning will result from measurements of DoA, ToA, AoA, RSSI, SNR, C/NO or another RF index in a manner known to a person of ordinary skill. This can be done for instance in a current smartphone using a software application. In this case, a hardware or software defined radio modification will be necessary to transpose the RF positioning signals to a GNSS band so that they may be processed by a standard GNSS receiver chain.

In yet another class of embodiments, DoA, ToA, AoA, RSSI, SNR, C/NO or another RF index may be calculated at the receiver on GNSS-like signals to confirm or modify the position calculated using the GNSS-like signals.

The RFFE of the transmitter of positioning signals may be a combination of one or more of an amplifier, a modulator and a frequency transposer in the case where the raw signals from the GNSS receiver are amplified, demodulated from the previous navigation message and re-modulated with a new navigation message and/or pseudorandom sequences. The positioning signals may also be shifted to another band as mentioned above.

The antenna elements, and possibly the Antenna Control Unit (ACU, see below) are also arranged so as to be able to generate different radiation patterns, as will be explained further down in the description. For doing so, a number of mechanical actuators, parasitic elements, phase shifters and/or driving circuits, DAC and beam-formers may be located close to the antenna elements.

A plurality of combinations of antenna elements, each for operating in one of the modes described above, may be provisioned under the radome.

According to some embodiments of the invention, the antenna arrangement may comprise an Antenna Control Unit (ACU, 560). The ACU comprises computing logic to determine the optimum operating mode based on an operator configuration or on information received from the rovers or through a base station or master relay platform through an uplink a QoS of reception of the positioning signals at the rovers. A QoS index may be a combination of one or more of SNR, DOP, UERE, etc. . . . . In some embodiments, some sub-areas in the AoS may get special treatment either permanently (a cross-road for instance), or intermittently, for instance if a specific traffic is planned. Also, specific rovers may also get special treatment by being granted a priority level that will increase the weight of a sub-area in the QoS index when a higher priority level rover enters the sub-area. The ACU is capable to send commands to switch the antenna arrangement from a mode to another mode, based on the output of the computing logic. The switch between operating modes may be mechanical or electrical.

Thus, the signals transmitted in LOS or near-LOS, that are unaffected, or moderately affected, by multipath reflections are transmitted to the rovers by the antenna arrangement with a higher gain.

In all variants of the invention, a compromise based on the application has to be determined between the improvements to the accuracy of the positioning that data fed to the processing unit provides and the cost in the additional power that has to be provided to the processing unit/ACU.

Figure 6:
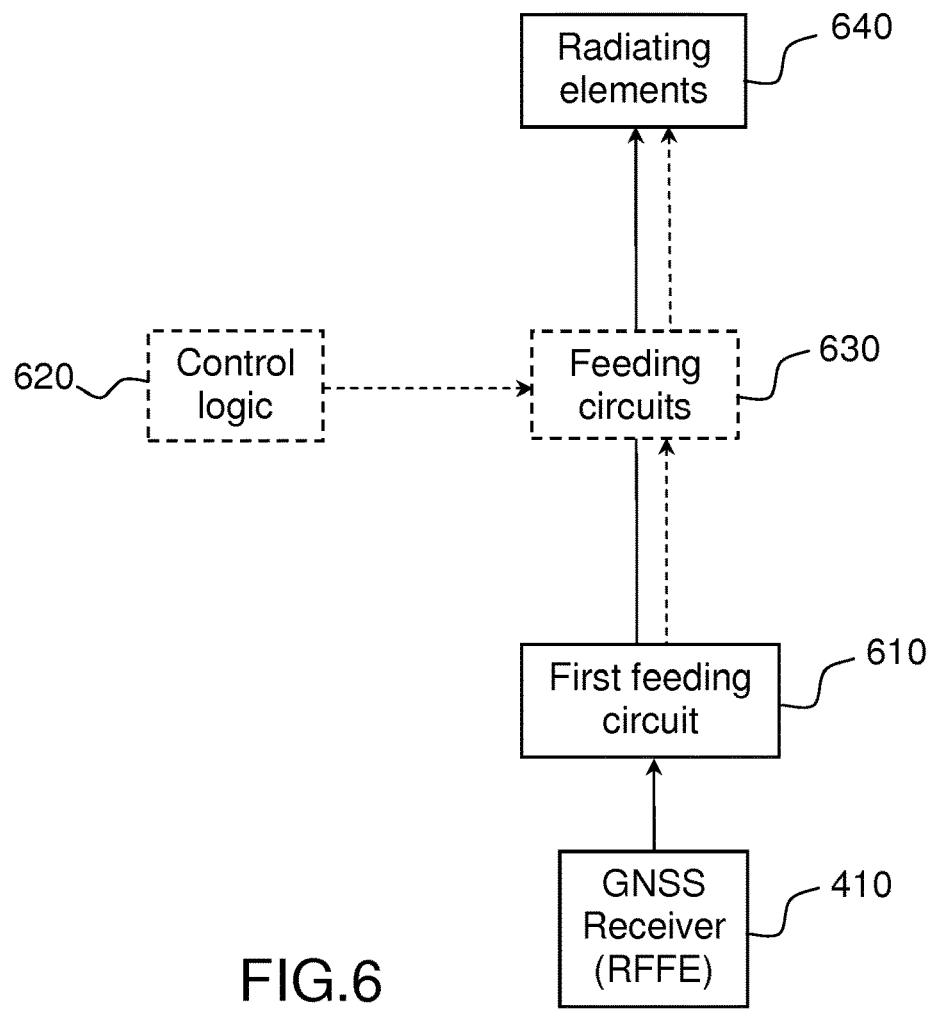
FIG. 6 displays a functional architecture of a transmit module of a relay platform to implement the invention in a number of its embodiments.

FIG. 6 displays a functional architecture of a transmit module of a relay platform to implement the invention in a number of its embodiments.

An antenna assembly according to some embodiments comprises:
- a first feeding circuit 610 connected to an output line of receiver of a time reference and/or GNSS signals;
- optionally, a control logic, 620;
- optionally, a second feeding circuit, 630;
- radiating elements, 640.

The first feeding circuit 610 receives raw signals from the RFFE of the GNSS receiver. It is configured to amplify the carriers of the GNSS signals and replace the GNSS navigation messages by replacement navigation messages comprising the ephemeris of the relay platform.

The optional control logic 620 may be an analog or a digital processor configured to generate the desired radiating pattern by sending control commands to the feeding circuits, as will be explained further down in the description.

The optional second feeding circuit 630 may be analog or digital. It may be a simple metallic feed line that feeds the analog signals transformed from the signals received at first feeding circuit 610 of the Transmit module 420 directly to the radiating elements 640. It may be an analog divider that feeds the positioning signals to the antenna elements. It may comprise a plurality of dividers arranged to feed part of the signals serially and part of the signals in parallel to the radiating elements 640. It may comprise one or more analog dephasing circuits. It may comprise a combination of one or more switches and adapted loads to perform antenna matching. It may comprise Digital to Analog Converters (DAC) at the input of some or all of the antenna elements and, possibly, before the DAC, a digital beam forming logic. Multiple configurations of the second optional feeding circuit are therefore possible, without departing from the scope of the invention.

The radiating elements 640 or the optional feeding circuit 630, optionally commanded by the control logic 620 feed the radiating elements 640.

In another embodiment, the radiating elements 640 may be patch elements having an identical form factor that are metallic geometries deposited on a PCB support. Each radiating element may advantageously be of a square form factor, although some other form factors (circular or triangular or polygonal or fractal) may be envisaged. Alternatively, the radiating elements may be monopole or dipole linear or helical radiating elements, arranged perpendicularly to a support of the radiating elements. In general, the radiating elements will be aligned in a direction perpendicular to the y direction in the reference frame of the relay platform on which they will be mounted (axis y, 131). The radiating elements form a network that generates a radiating pattern defined by the geometry of the elements, their relative positioning, their orientation, the type of feeding circuit to form the pattern, and the configuration of the optional control logic to command the feeding circuit. The way to define the number of radiating elements and their spacing will be discussed further down in the description.

FIGS. 7a to 7h represent antenna elements and their feeding circuits in a plurality of embodiments of the invention.

In all figures, the combination of radiating elements and feeding circuitry is designated by the same reference numeral 700.

In all figures, the radiating elements are metallic patch elements deposited on a PCB. A number of four elements is generally illustrated on the figures, while a lower number (FIG. 7e) or a higher number (not illustrated) may be contemplated. Other form factors and technologies may also be contemplated without departing from the scope of the invention.

Figure 7B:
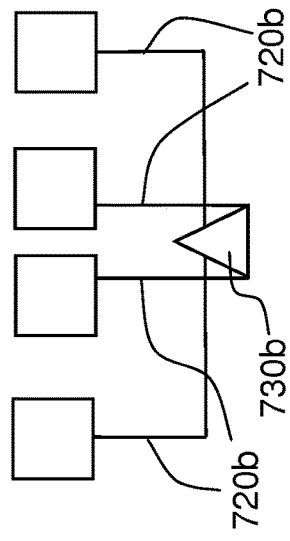
FIGS. 7a to 7h represent antenna elements and their feeding circuits in a plurality of embodiments of the invention.
Figure 7D:
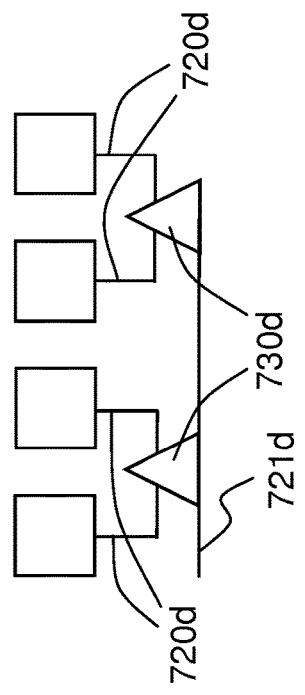
Figure 7E:
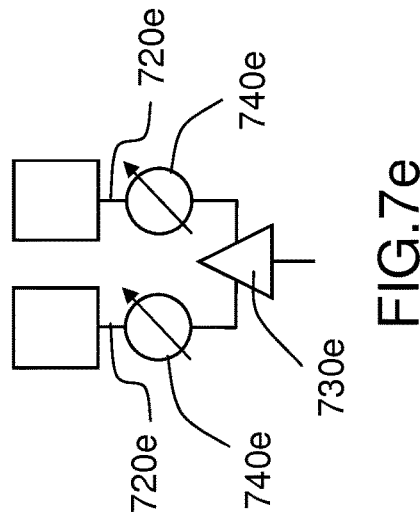
Figure 7A:
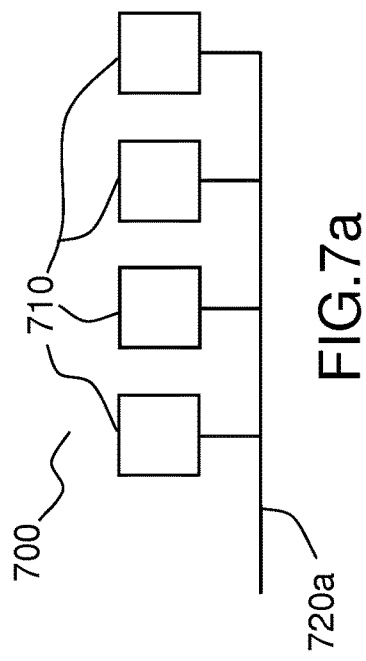

FIG. 7a represents four radiating elements 710 with a simple feed line 720a that directly feeds serially the signals at the output of the first feeding circuit. The positioning signals are thus transmitted as is by each antenna element.

FIG. 7b represents a feed line 720b with a 1 to 4 divider 730b, that divides serially (e.g. splits) the positioning signals to be transmitted to the four radiating elements 710. This arrangement offers a larger bandwidth than an arrangement of the type of FIG. 7a. This is notably advantageous in the case of multi-frequency transmitters, but this configuration will have a larger footprint in the antenna assembly.

Figure 7C:
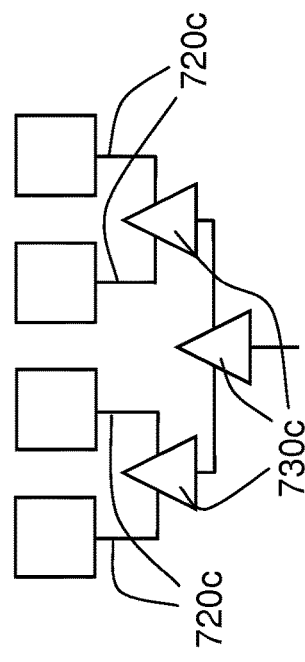

FIG. 7c represents a plurality of parallel feed lines 720c with three 1 to 2 dividers 730c that split the positioning signals in parallel to feed them to radiating elements 710. This arrangement also offers a gain in bandwidth, in this case at the expense of both a larger footprint and some additional losses, in comparison to the arrangement of FIG. 7a.

FIG. 7d represents a plurality of parallel feed lines 720d with two 1 to 2 dividers 730d that split the positioning signals in parallel and feed them to a serial line 721*d* that feeds the split signals to the radiating elements. This configuration may be a good compromise between those of FIGS. 7*a*, 7*b* and 7*c*, offering a wider bandwidth than the one of FIG. 7*a* and lower footprint than those of FIGS. 7*b* and 7*c* and lower losses than the one of FIG. 7*c*.

FIG. 7*e* represents two antenna elements 710, with parallel feed lines 720*e*, a 1 to 2 divider 730*e* and two phase shifters 740*e* at the input of each antenna element. The phase shifters are configured to shift the phases of the received signals before their splitting.

Figure 7G:
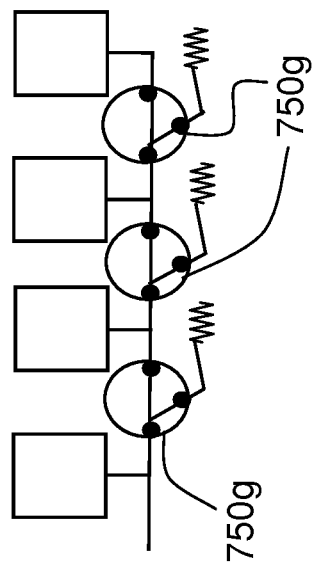
Figure 7H:
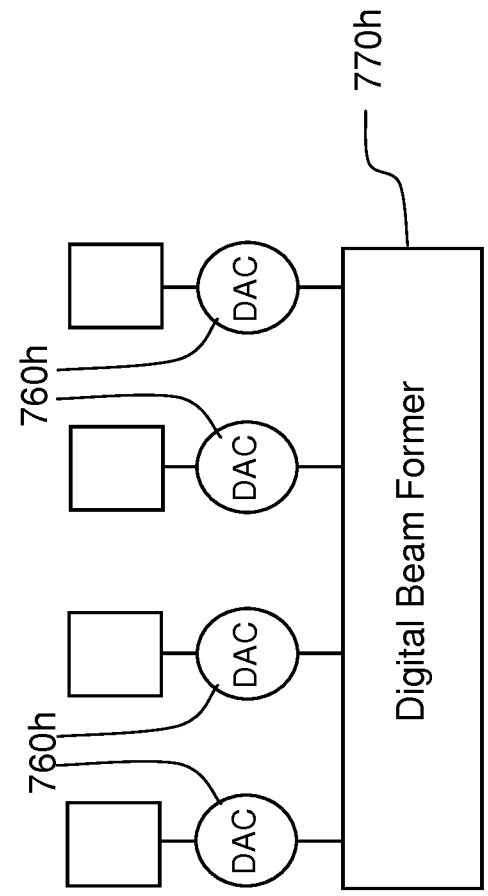
Figure 7F:
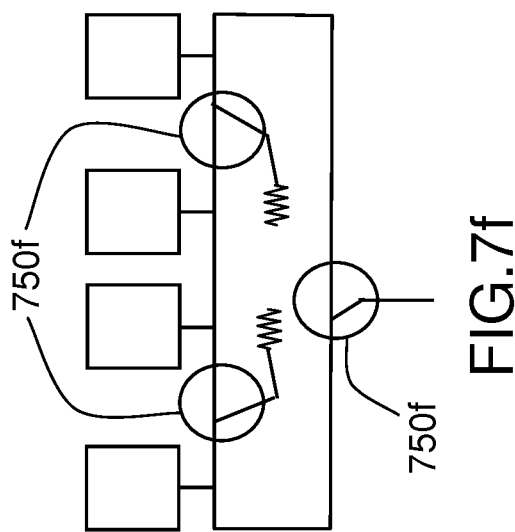

FIGS. 7*f* and 7*g* represent different configurations of feeding circuits comprising a number of switching circuits having or not an adapted load, the switches allowing to activate/deactivate part of the antenna elements.

FIG. 7*h* represents an antenna assembly comprising Digital to Analog Converters (DACs) 760*h* at the input of each antenna element 710, said DAC receiving the digital input representative of the positioning signals from one of the feeding circuits and feeding their analog output to the antenna elements. The beam former advantageously allows a more precise configuration of the radiating pattern than the other arrangements where the variations of the radiating patterns is confined to a number of discrete options, at the expense of a higher implementation cost, due in particular to the addition of one or more Low Noise Amplifiers (LNA) and filters at the input of each antenna element and, possibly, of an up converter at the input of the LNAs, depending on the sampling frequency of the DACs.

Selection of one of the embodiments illustrated by FIGS. 7*a* to 7*h*, or of a variant thereof, is discussed in relation with FIGS. 8*a* to 8*c* below. These embodiments are illustrative only of the design options available to configure a desired radiating pattern according to the invention. Many others may be contemplated without departing from the scope of the invention. Also, some of these embodiments may be combined. For instance, different radiating elements may be activated in different transmit conditions, the activation/deactivation being commanded by one or more switches as illustrated on FIGS. 7*f* and 7*g*. The radiating elements that are active at a moment in time, based on the position of the switch, may include phase shifters that will generate linear phase shifts. Also, a beam-forming circuit may consolidate both kinds of controls (activation/deactivation of a number of radiating elements, generation of a linear phase shift applied to the active radiating elements).

Figure 8A:
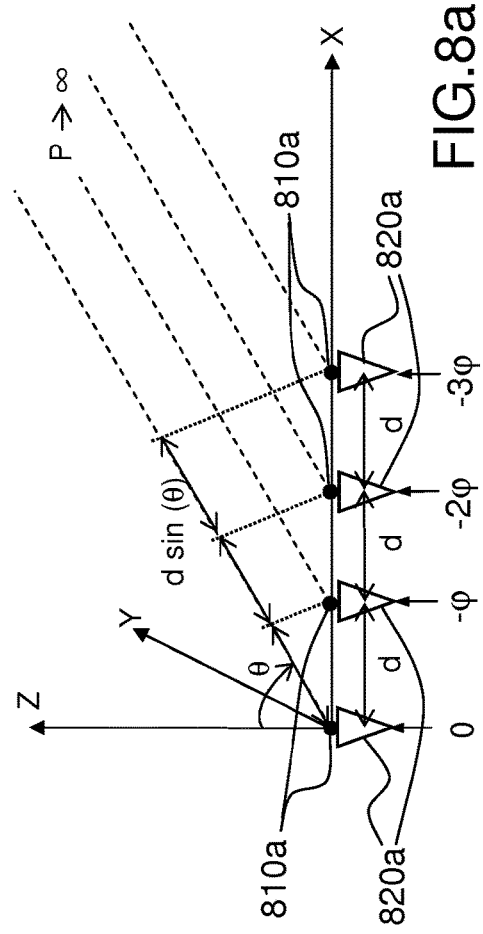
FIGS. 8a to 8c illustrate some design rules to be applied to select an antenna assembly configuration according to some embodiments of the invention.
Figure 8C:
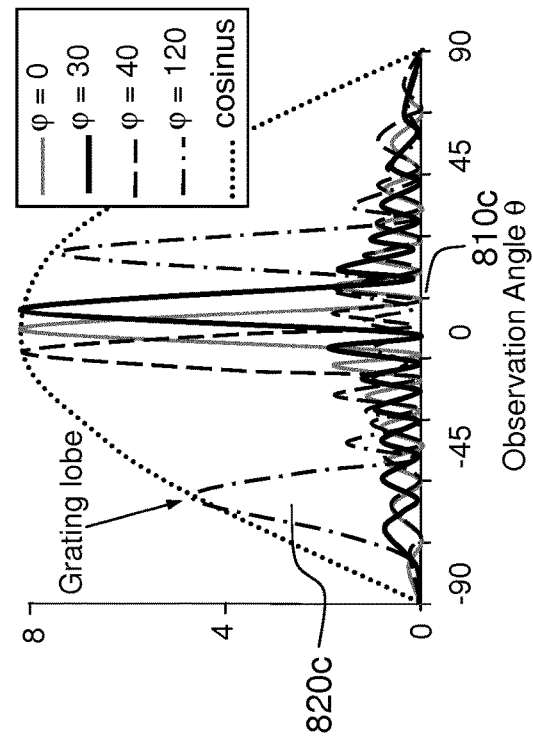
Figure 8B:
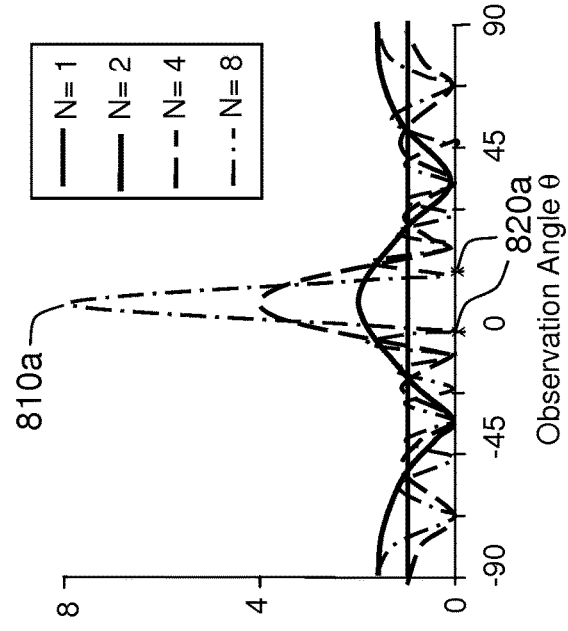

FIGS. 8*a* to 8*c* illustrate some design rules to be applied to select an antenna assembly configuration according to some embodiments of the invention.

In the embodiments that include phase shifters, such as those of the type depicted on FIG. 7*h*, it is possible to calculate the main parameters of the network of antenna elements by applying formulas known from the array theory, commented upon below in relation to FIGS. 8*a* to 8*c*.

FIG. 8*a* is a schematics that illustrates N identical radiating sources 810*a* positioned along axis x at even distance d from one another. In the example illustrated on the figure, N=4. Uncoupled feeds are assumed. Phase shifters 820*a* generate a linear phase gradient (from $-\varphi$ at the second feed up to $-3\varphi$ at the fourth feed). If P is a point located at a distance r from the radiating sources (with a far field assumption, r being much larger than d), the electric field at P, $\vec{E}(P)$ is given by the following formula:

$$\vec{E}(P) = E(\theta)\frac{e^{-jkr}}{r}\vec{e}_p \quad (1)$$

where $E(\theta)$ is the sum of the electric field to be transmitted by the elementary radiating pattern generated by an individual element, k is the wave number at the frequency of operation and $\vec{e}_p$ is the field orientation at a given instant. The norm of E(θ) is in turn given by the following formula:

$$|E(\theta)|=N\times|F(\theta)|\times AF \quad (2)$$

AF is the Array Factor and depends only on the geometry of the array (N, d) and of the phase shift $\varphi$.

$$AF = \left|\frac{\sin N\left(\frac{\pi}{\lambda}d\sin\theta - \frac{\varphi}{2}\right)}{N\sin\left(\frac{\pi}{\lambda}d\sin\theta - \frac{\varphi}{2}\right)}\right| \quad (3)$$

As shown on FIG. 8*b*, the maximum amplitude of the field 810*b* ($D_{max}$) increases with the number of feeds N while its aperture 820*b* ($\theta3_{dB}$) decreases.

Also, as shown on FIG. 8*c*, the pointing direction (or direction of the main lobe) 810*c* varies with the dephasing. Under certain conditions, grating lobes 820*c*, i.e. side lobes with an amplitude close to the amplitude of the main lobe, may appear. To avoid these grating lobes, the distance d between the radiating elements should a value that is lower than a maximum, according to the following formula:

$$\frac{d}{\lambda} < \frac{1}{1+|\sin\vartheta_m|} \quad (4)$$

where $\vartheta_m$ is the maximum desired angle of depointing.

Applying these design rules then allows an antenna artisan to configure an antenna arrangement to fit the specification of the radiation pattern to be obtained to implement the invention, according to some of its embodiments.

Advantageously, an antenna arrangement according to the invention may have between 2 to 8 patch elements, with a total width of the arrangement of about λ (where λ is a wavelength for L-band or Wi-Fi positioning signals) and a distance between elements of λ/8, λ/4 λ/2, or λ. Switches may command a determined number n out of the N elements to be active at the same time and fed serially or in parallel. The higher n is, the thinner the aperture of the sectorial radiating pattern. With a low number n of elements (1 or 2, preferably situated in the middle of the array) that are activated (i.e. connected to the feed line through the switch) the radiating pattern will have an open FOV in the (x, z) plane and come close to the pattern of an omnidirectional antenna. Conversely, with a high number n of elements (6 to 8, for instance), the radiating pattern will have a low aperture with a narrow FOV in the (x, z) plane, coming close to the configuration of a "perfect" sectorial antenna, whose radiating energy is concentrated in a narrow sector in the (y, z) plane. In addition, phase shifters may impart a depointing to the radiating pattern, the angle of depointing being determined by the amount of phase shift applied linearly from one antenna element to the next in line that is activated.

Figure 9:
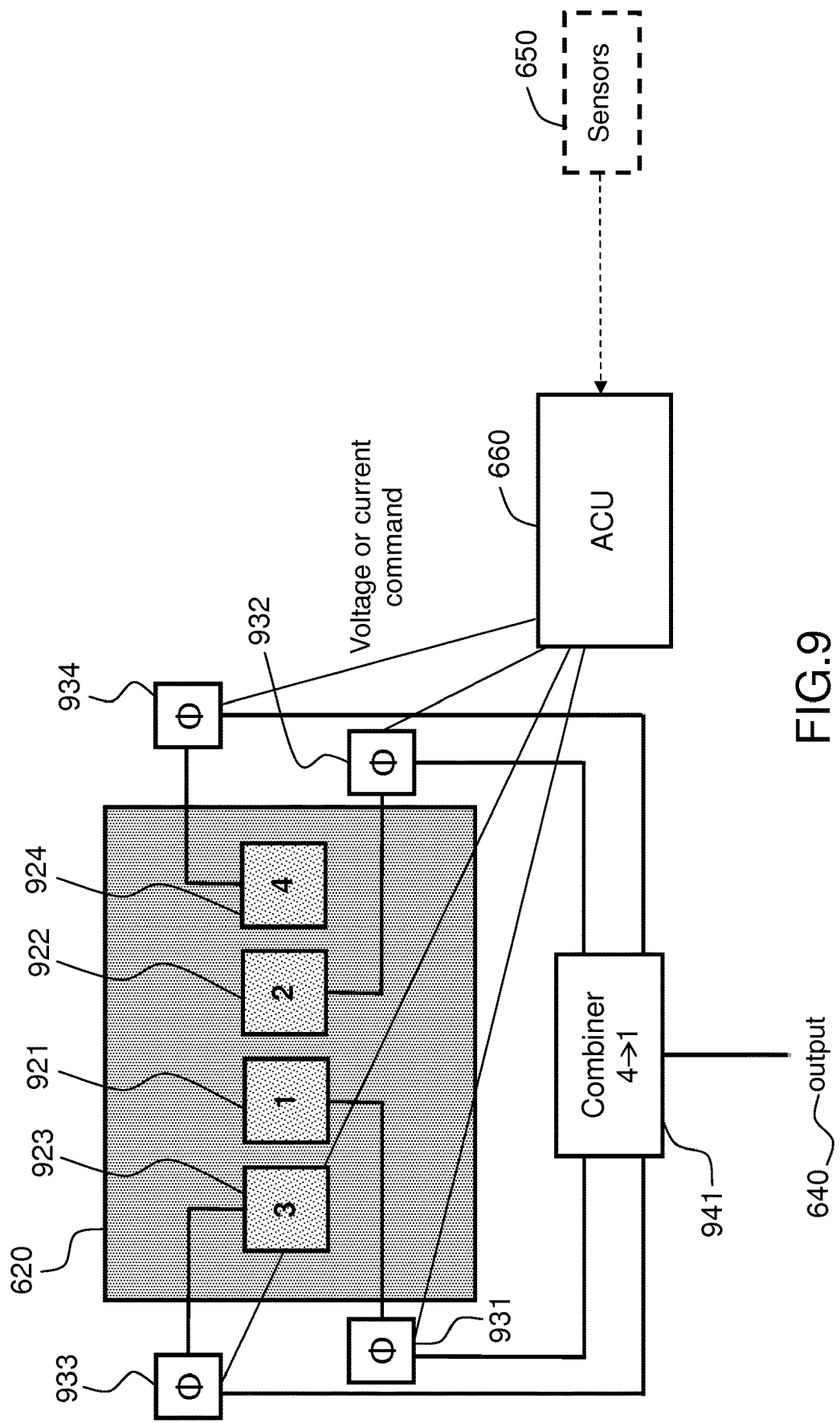
FIG. 9 represents an architecture of an antenna arrangement in some embodiments of the invention.

FIG. 9 represents an architecture of an antenna arrangement in some embodiments of the invention.

The antenna arrangement of the figure is a specific embodiment of the antenna arrangement of FIG. 5, where the antenna array 520 comprises 4 radiating elements 921, 922, 923, 924.

The four radiating elements may for example be spiral elements. They may also be helix antennas. They may also be patch antennas, possibly in stacked configuration. The patch antennas may be built in a meta-material, possibly an Artificial Magnetic Conductor (AMC).

The radiating elements may be arranged in a line of radiating elements with a 100 mm spacing, which is approximately half the wavelength for a GPS L1 frequency of 1,575 GHz. If the positioning signals are transmitted in a 2.4 GHz Wi-Fi band, the spacing may be of about 62 mm (and about 28 mm for the 5.2 GHz Wi-Fi band). The radiating elements may be protected against mutual coupling by providing a specific ground plane structuring.

The 4 radiating elements may be driven by 4 phase shifters 931, 932, 933, 934. The phase shifters may be two-state phase shifters (0°-180°), or phase shifters configured to determine a targeted depointing angle of the radiating pattern together with a specific aperture, as already explained. Phase shifting may be performed by parasitic elements, active lenses or accordable components. The parasitic elements may be Micro Electro Mechanical Systems (MEMS) controlled by an actuator. Generally, the phase shifters receive voltage or current commands from the ACU, 560. The commands are configured to generate the radiation pattern corresponding to the operating mode that is determined to be adequate to the environment of the relay platform, either at the time of conditioning or by the processing logic of the ACU.

Alternatively, the phase shifters may be replaced by a combination of a digital beam-forming circuit and a plurality of DACs to convert the digital input directed to each antenna element to an analog signal and feed this signal to the appropriate radiating element.

Figure 10:
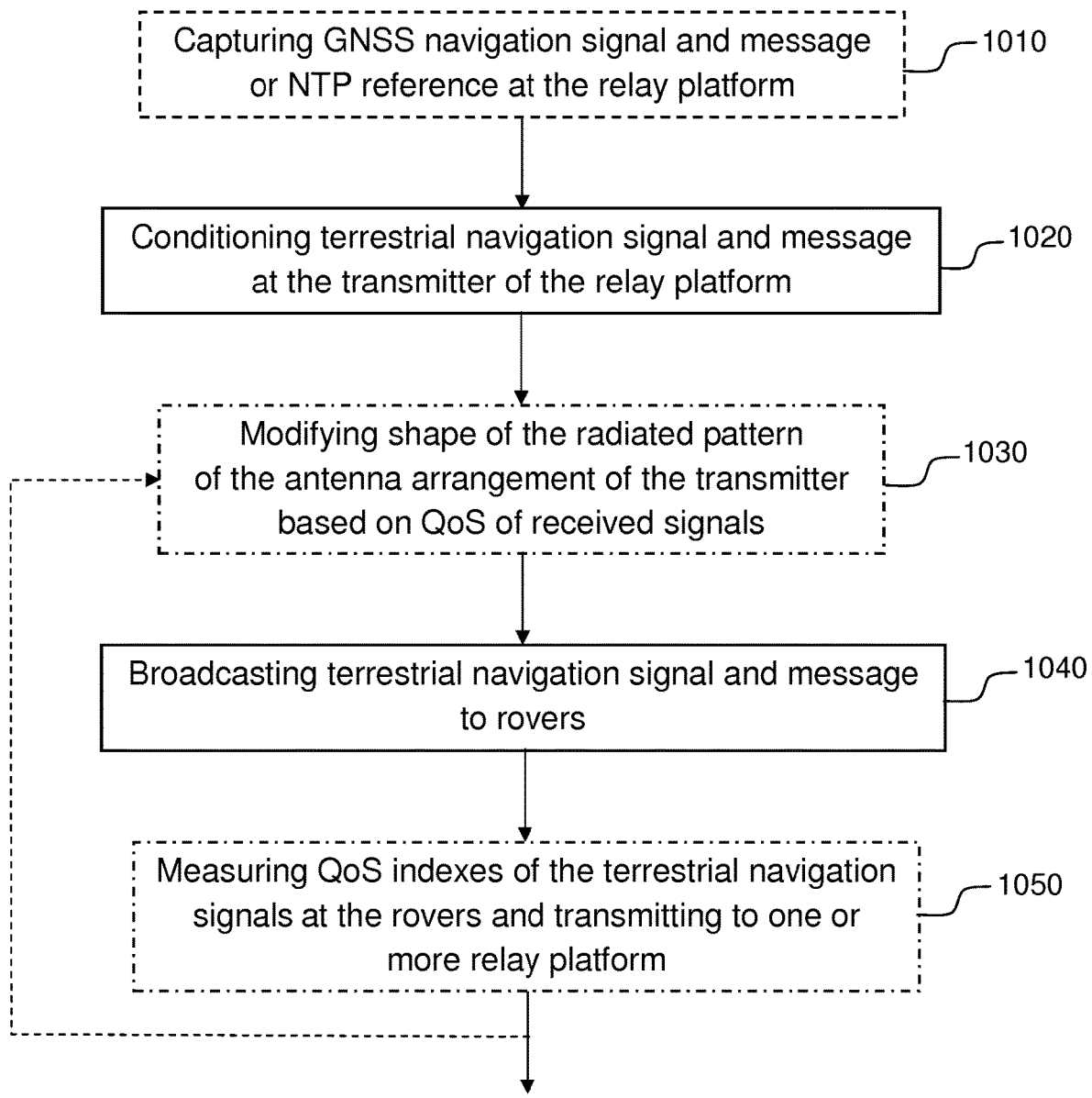
FIG. 10 displays a flow chart of a method to implement the invention in a number of its embodiments.

FIG. 10 displays a flow chart of a method to implement the invention in a number of its embodiments.

At an optional step 1010, the GNSS navigation signals and navigation messages are captured. The signals are raw signals coming from an output of the GNSS receiver RFFE. The signals may be coming from a single constellation or from a plurality of constellations. They may be single frequency or multi-frequency. They may include corrections, for instance of atmospheric (ionospheric and/or tropospheric) errors. When the relay platform is installed permanently, its position is well known, possibly with the highest accuracy and the only information that is useful is the time information that will be used to synchronize all the transmitters of the relay platforms in the AoS. In an optional version, thus, only a GNSS time reference is captured from the navigation signals and messages.

In some embodiments, the constellation of relay platforms is deployed on an ad-hoc basis to monitor a specific mission (i.e. rescue for instance). In this case, the position of the relay platforms needs to be ascertained and will be captured in full from the GNSS receiver. Also, in some embodiments, the position of the relay platform has to be certified, for instance to validate a transaction. In this case, the GNSS receiver at the relay platform will have to be tamper-resistant and its certified PVT may be enciphered, signed by a certificate in the relay platform processor and appended in the navigation message sent to the rovers in the AoS.

Then, a terrestrial navigation signal possibly carrying a navigation message is conditioned (generation of the waveform; modulation with a PRS and/or a navigation message, transmission) (step 1020). The conditioning may be independent from the conditions of reception when the configuration of the antenna arrangement in the transmit module is not adaptive.

When such configuration is adaptive, at an optional step 1030, the radating pattern of the antenna arrangement may be modified as a result of an assessment of the QoS of the received positioning signals at the rovers in the AoS.

Then, the terrestrial positioning signals comprising the navigation messages are broadcast (step 1040).

In an optional step 1050, a number of QoS indexes of the received signals may be measured at the rovers, and fed back to the control logic/ACU of the transmit module.

In some embodiments, the relay platforms may be managed by an operating entity that registers them as well as positioning terminals the users of which are subscribers to a positioning service managed by the operating entity. The operating entity may be a private concern funded by a fee or by other services such as renting of autonomous vehicles, vendors of navigation systems, etc. . . . . The operating entity may also be a national, regional or local government agency that provides positioning services as part of its mission. Whatever the mode of management, the operating entity may regulate access to the positioning service by providing authentication keys to avoid tempering. The users may then have to be pre-registered to benefit from the service. Or the service may come as part of a rental contract of automotive vehicles. Or it may be provided as a bonus service by delivery companies that use the service to optimize the management of their fleet of delivery vehicles and provide it at a marginal additional cost to third party users.

Figure 11:
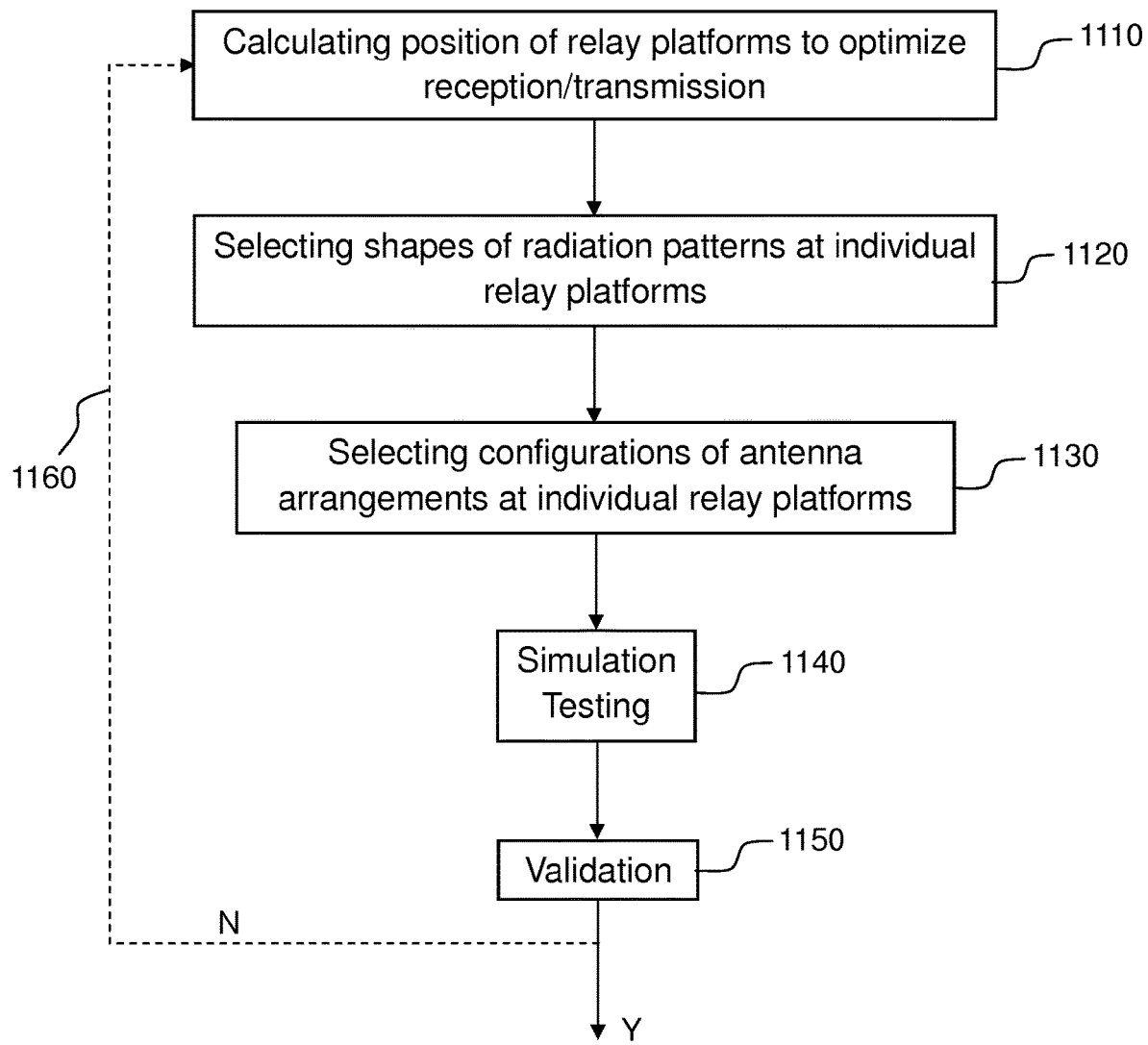
FIG. 11 displays a flow chart of a design method of a relay platform in a number of embodiments of the invention.

FIG. 11 displays a flow chart of a design method of a collection of relay platforms in a number of embodiments of the invention.

An operating entity of a network of relay platforms will start by commissioning a design agency to calculate the positions of the relay platforms to optimize reception of GNSS signals (unless it decided to rely exclusively upon an NTP reference). The optimum positions for these relay platforms will be selected by applying a method close to the one used to design coverage and optimum positions of the base stations of a cellular communication network. The number of relay platforms necessary to cover an AoS with a defined QoS will depend mainly on the transmit power authorized in the area in the band used, on the height, width and shape of the canyons to equip, the known obstacles (on top of the buildings and obstacles that define the canyon itself) and on the Dilution Of Precision (DOP) of the signals of the constellation of relay platforms. For terrestrial vehicles, the goal will preferably be to optimize the Horizontal DOP (HDOP), while for drones, the goal will preferably be to optimize the Vertical DOP (VDOP). Some relay platforms may be specifically positioned to optimize VDOP, for instance by provisioning relay platforms that have two main radiating lobes, in the vertical plane, as illustrated on FIG. 2.

Then a precise position of the T/R module will have to be determined. This should favour a position overhanging the street/road on the top of a mid-height building in an AoS. The position should be determined in such a way that the orientation of the antenna arrangement of the transmit module is directed downwards, with a lateral edge of the main radiating lobe of radiation close to the vertical direction of the frame of reference of the relay platform (with a vertical direction z pointing downwards, a direction along the street/road y pointing in the direction of movement of traffic when said traffic is moving on the right hand side of the street/road and a perpendicular direction pointing towards the buildings x). This can be achieved in a design house or on the field, at a step 1110.

Then, the selection of a shape of radiating pattern is to be achieved at a step 1120. This selection is based in the criteria commented upon in relation to FIGS. 1, 2, 3a to 3d. This selection is based on an analysis of the properties of the terrain around the relay platform and in the streets/roads in the AoS. This may be done in a design house and/or on the field.

Then, adequate transmit module and antenna assembly configurations should be selected (step 1130) as explained in relation to 7a-7h and 8a-8c.

Finally, the configuration should be simulated and/or tested (step 1140) and the configuration validated (step 1150) if the validation criteria are met (minimum QoS targets in the AoS for instance). The design needs to be adjusted if the validation criteria are not met (step 1160).

Although the invention has been described mainly in use cases where the transmit modules of the relay platforms and the receive modules of the rovers are configured to transmit and receive positioning signals in the RF frequency bands, in some embodiments it is possible to use Visible Light Communication (VLC) systems that operate in the optical wavelengths spectrum. Such T/R modules have been described in European patent application published under n° EP3229037 assigned to the same applicant. Specific assemblies will be needed to shape the radiating patterns as required by the invention. A person of ordinary skill in VLC systems will know how to derive the configurations of these assemblies from the ones depicted in this description in a context of RF communication systems.

The examples disclosed in this specification are only illustrative of some embodiments of the invention. They do not in any manner limit the scope of said invention which is defined by the appended claims.

The invention claimed is:

1. An antenna assembly configured to transmit terrestrial positioning signals from a relay platform having a frame of reference, said transmit being in a first mode with a radiating pattern having at least a main lobe having a narrow aperture in a first plane of reference comprising a vertical axis and a first horizontal axis and a wide aperture in a second plane of reference comprising the vertical axis and a second horizontal axis perpendicular to the first horizontal axis, the antenna assembly comprising:
   N antenna elements of an identical form factor, N being higher than one, the N antenna elements being aligned in direction of the first horizontal axis and being spaced of an even distance d,
   a feeding circuit configured to feed all or part of the N antenna elements with positioning signals generated at an RF Front-End of a transmitter of positioning signals, and
   a control logic configured to generate control commands to be sent to the feeding circuit, to modify one or more of the apertures of the sectorial radiating pattern in the first plane of reference and a value of its depointing.

2. The antenna assembly of claim 1, wherein the radiating pattern is depointed in the first plane of reference.

3. The antenna assembly of claim 1, wherein the N antenna elements are one of patch antenna elements laid out in a third plane of reference comprising the first horizontal axis and the second horizontal axis, or monopoles, dipoles or helical elements erected in the first plane of reference.

4. The antenna assembly of claim 1, wherein the feeding circuit comprises one or more combiners/dividers configured to combine positioning signals received from two or more channels of the transmitter of positioning signals into a single positioning signal.

5. The antenna assembly of claim 1, wherein the feeding circuit comprises one or more phase shifters configured to impart a predefined phase shift that varies linearly from a first antenna element to a next one in the line.

6. The antenna assembly of claim 1, wherein the feeding circuit comprises one or more switches configured to activate/deactivate one or more of the N antenna elements.

7. The antenna assembly of claim 1, wherein the feeding circuit comprises at least one Digital to Analog Converter and a beam-forming circuit.

8. A method of designing an the antenna assembly fit transmit positioning signals from a relay platform having a frame of reference, said transmit being in at least a first mode with a radiating pattern having at least a main lobe, the at least a main lobe having a narrow aperture in a first plane of reference comprising a vertical axis and a first horizontal axis and a wide aperture in a second plane of reference comprising the vertical axis and a second horizontal axis perpendicular to the first horizontal axis, the method comprising:
   defining N number of antenna elements of an identical form factor to be aligned in an x direction of the first horizontal and being spaced of an even distance d, wherein N is greater than one;
   feeding all or part of the N antenna elements with positioning signals generated at an RF Front-End of a transmitter of positioning signals; and
   providing control commands to modify one or more of the apertures of the radiating pattern in the first plane of reference and a value of its depointing.

* * * * *